April 30, 1968 G. W. COOK 3,381,142
VOLTAGE COMPARISON AND GATING CIRCUIT
Filed Feb. 15, 1965
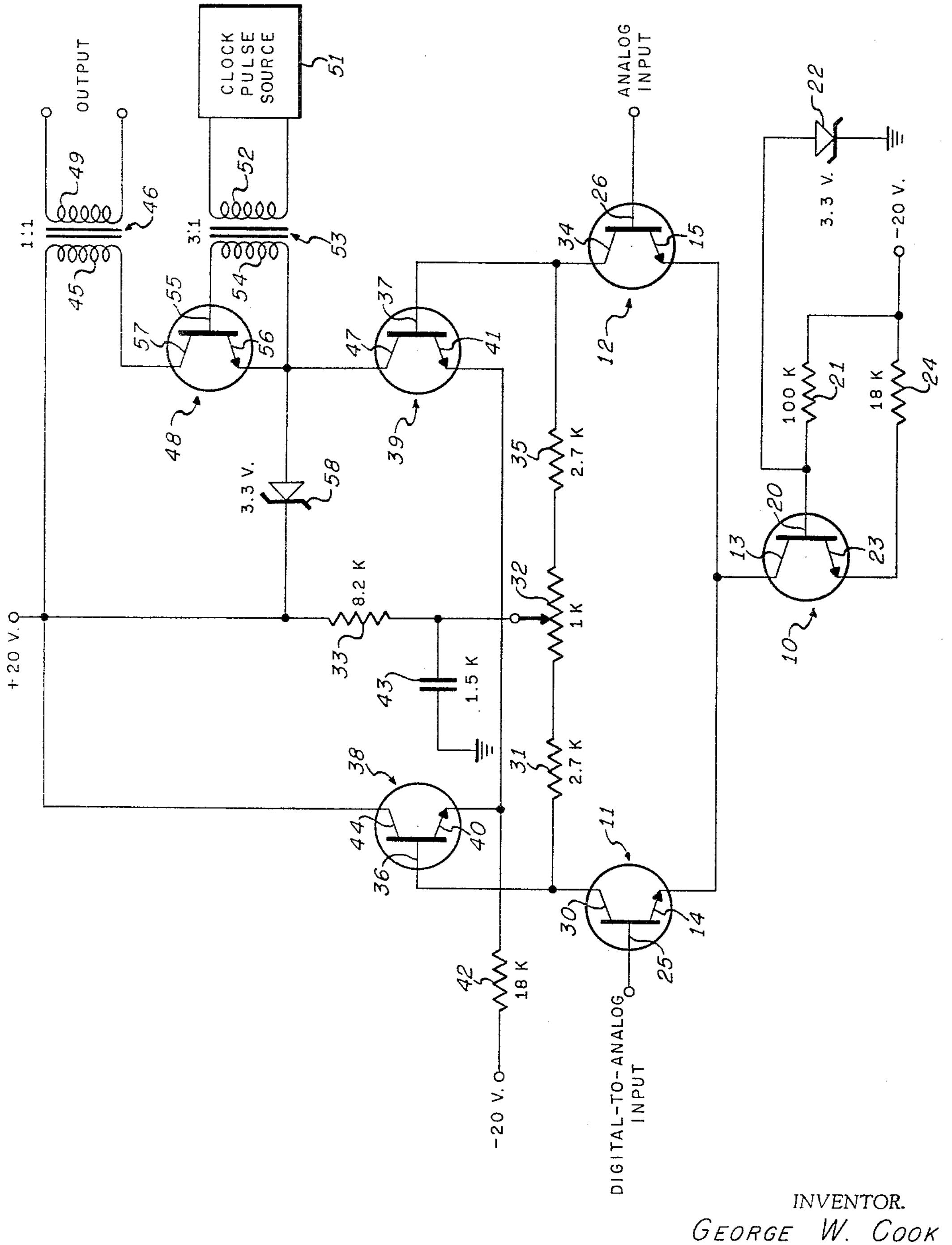
INVENTOR.
GEORGE W. COOK
BY [signature]
ATTORNEY 3,381,142

VOLTAGE COMPARISON AND GATING CIRCUIT

George W. Cook, Scottsdale, Ariz., assignor to Sperry Rand Corporation, Great Neck, N.Y., a corporation of Delaware Filed Feb. 15, 1965, Ser. No. 432,735
5 Claims. (Cl. 307—235)

The present invention relates to comparison and gating circuits and particularly to circuits for providing pulses only when a signal voltage is greater than a reference voltage.

The present invention is particularly applicable as a comparison and gating circuit in an analog to digital conversion for digital computers when utilizing the successive approximation method, for example, as disclosed in the "Handbook of Automation, Computation, and Control," volume 2, edited by Grabbe, Ramo and Wooldridge, published by John Wiley and Sons, New York, copyright 1959, page 20–63, Figure 45.

Prior art devices of this type are particularly vulnerable to variations in the supply voltages which result in unbalanced operation. The present invention overcomes this problem in that reasonable variations of the supply voltages do not affect the amplifier balance and no errors are introduced by small variations in common mode input signals. Further, the present invention is extremely compact and has a very low power loss.

A primary object of the present invention is to provide a comparison circuit for delivering pulses only when a signal voltage is greater than a reference voltage.

Another object of the present invention is to provide a comparison and gating circuit for providing pulses only when a signal voltage is greater than a reference voltage that is insensitive to reasonable variations of the supply voltages.

The above objects are achieved by utilizing a transistorized two-stage differential amplifier in conjunction with transformer coupling of clock pulses to a load where the associated comparison transistors of the differential amplifier are coupled to common supply voltages.

These and other objects of the present invention will become apparent by referring to the drawing which is a schematic diagram of a comparison and gating circuit utilizing the present invention.

Referring to the drawing, a transistor 10 provides a constant current source to transistors 11 and 12 by having its collector 13 connected to the emitters 14 and 15 of the transistors 11 and 12 respectively. The base 20 of the transistor 10 is connected to a —20 v. source through a resistor 21 and to ground potential through a Zener diode 22. The emitter 23 of the transistor 10 is also connected to the —20 v. source through a resistor 24. By having the emitters 14 and 15 of the transistors 11 and 12 connected together and to a common source of constant current, their output voltages are not affected by variations of the common mode input.

The base 25 of the transistor 11 is adapted to be connected to a reference voltage source which may, for example, be the digital-to-analog input voltage from the flip flops of a successive approximation voltage-to-digital conversion unit of the type shown in Fig. 45 on page 20–63 of said "Handbook of Automation, Computation, and Control." The base 26 of the transistor 12 is adapted to be connected to a signal voltage which is to be compared to the reference voltage which may, for example, be the analog input to the comparison circuit shown in said Figure 45 and may vary between zero and +5 v.

The collector 30 of the transistor 11 is connected through a resistor 31, a potentiometer 32 and a resistor 33 to a +20 v. source. Similarly, the collector 34 of the transistor 12 is connected through an equal impedance path consisting of resistor 35, the potentiometer 32 and the resistor 33 to the +20 v. source. The collectors 30 and 34 are also connected respectively to the bases 36 and 37 of respective transistors 38 and 39. The emitters 40 and 41 of the transistors 38 and 39 are connected together and to a —20 v. source through a resistor 42. The junction between the variable arm of the potentiometer 32 and the resistor 33 is connected to ground potential through a capacitor 43.

The collector 44 of the transistor 38 is connected to the +20 v. source and to one terminal of the primary winding 45 of an output transformer 46. The collector 47 of the transistor 39 is connected through a transistor 48 to the other terminal of the primary winding 45 and thence to the +20 v. source. As interconnected, the transistors 11, 12, 38 and 39 form an improved two stage differential amplifier 50 generally of the type disclosed in General Electric Transistor Manual, seventh edition as Fig. 4.21 on page 118. The secondary output winding 49 of the output transformer 46 is adapted to be connected to provide output signals in the form of clock pulses, in a manner to be described.

The clock pulses are generated by a clock pulse source 51 that is connected to the primary winding 52 of an impedance matching transformer 53. The secondary winding 54 of the transformer 53 has one terminal connected to the base 55 of the transistor 48 and its other terminal connected to the junction of the collector 47 of the transistor 39 and the emitter 56 of the transistor 48. The collector 57 connects the transistor 48 to the other terminal of the primary winding 45. A Zener diode 58 has one extremity connected to the collector 47 and its other extremity connected between the +20 v. source to limit the magnitude of the output voltage and to maintain proper polarizing voltages on transistor 49 for the time period between clock pulses.

Generally, a successive approximation type of analog-to-digital converter operates in the following sequence:

The most significant bit flip flop is energized which causes a one half of full scale voltage from the digital-to-analog network to be applied to one input of the comparison circuit, in this instance, the base 25 of the transistor 11. If this voltage is greater than the analog input voltage applied to the base 26 of the transistor 12, the comparator must generate a "turn off" pulse which will be gated back to the most significant bit flip flop (not shown) and turn it off.

Then the next most significant bit flip flop (not shown) is energized which causes one-fourth of the full scale voltage to be added to the voltage left over from the first step (i.e., either zero or one half of full scale voltage). If this voltage is greater than the analog input, the comparator must generate a "turn off" pulse which will be gated back to the next most significant bit flip flop and turn it off.

This process continues for all the bits which are mechanized. Each successive bit is reduced in voltage by one-half from the preceding bit.

Specifically, in operation, the constant current provided by the transistor 10 is directed to flow through whichever transistor 11 or 12 which has the largest input voltage applied to its respective base 25 or 26. The transistors 38 and 39 have their emitters 40 and 41, respectively, connected together and to a common emitter resistor 42 and thence to the —20 v. source such that a fixed amount of current will flow through whichever one of the transistors 38 or 39 which has the largest input voltage applied to its respective base 36 and 37. When the input voltage to the base 25 is greater than the input voltage to the base 26, the constant current flows through transistor 11, resistor 31 and part of resistor 32 which causes the base 36 of the transistor 38 to be at a lower voltage than the base 37 of the transistor 39. Thus the current from the —20 v. source via the resistor 42 will flow through the transistor 39 thereby providing a clock pulse return connection through the transistor 39. Now when a clock pulse is passed through the transformer 53 from the source 51 to the base 55 of the transistor 48, the transistor 48 will conduct since it has a return path through the transistor 39. The clock pulses are then conducted through the transistor 48 to the primary winding 45 of the output transformer 46 and are coupled through the output winding 49 to provide an output in the form of a clock pulse to the flip flop or other load not shown.

Conversely, when the input voltage to the base 26 of the transistor 12 is greater than the input voltage to the base 25 of the transistor 11, the constant current provided by the transistor 10 is directed through the transistor 12, resistor 35 and the other part of resistor 32 which causes the base 37 of the transistor 39 to be at a lower voltage than the base 36 of the transistor 38. This results in the transistor 39 being off and effectively acting as an open circuit as far as the transistor 48 is concerned. Thus, the clock pulses from the source 51 cannot turn the transistor 48 on and there is no clock pulse output from the secondary winding 49.

It will be appreciated from the above explanation of the present invention that precise regulation of the power supplies is unnecessary and also that the circuit of the present invention is insensitive to common mode signals.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A comparison circuit comprising:

(1) first, second, third, fourth and fifth electronic amplifying elements each having an input electrode and first and second conduction electrodes, (2) the first electrodes of said first and second elements being connected together and to a common current source, (3) the input electrode of said first element being coupled to a source of reference voltage, (4) the input electrode of said second element being coupled to a signal voltage to be compared with said reference voltage, (5) the second conduction electrodes of said first and second elements being connected to the input electrodes of said third and fourth elements, respectively, and through a common impedance to a first common voltage source, (6) the first conduction electrodes of said third and fourth elements being connected together and to a second common voltage source, (7) said fifth element having its first conduction electrode connected to the second conduction electrode of said fourth element, (8) the input electrode of said fifth element being connected to a source of clock pulses, and (9) transformer means having a primary and a secondary winding,

(10) said primary winding having one terminal connected to the second conduction electrode of said fifth element and another terminal of said primary winding being connected to said first common voltage source and to the second conduction electrode of said third element whereby said secondary winding provides clock pulses only when said signal voltage exceeds said reference voltage.

2. A comparison circuit comprising:

(1) first, second, third, fourth and fifth transistors each having a base, a collector and an emitter electrode, (2) the emitter electrodes of said first and second transistors being connected together and to a common current source, (3) the base electrode of said first transistor being coupled to a source of reference voltage, (4) the base electrode of said second transistor being coupled to a signal voltage to be compared with said reference voltage, (5) the collector electrodes of said first and second transistors being connected to the base electrodes of said third and fourth transistors, respectively, and through a common voltage dividing network to a first common voltage source, (6) the emitter electrodes of said third and fourth transistors being connected together and to a second common voltage source, (7) said fifth transistor having its emitter electrode connected to the collector electrode of said fourth transistor, (8) the base electrode of said fifth transistor being connected to a source of clock pulses, and (9) transformer means having a primary and a secondary winding,

(10) said primary winding having one terminal connected to the collector electrode of said fifth transistor and another terminal of said primary winding being connected to said first common voltage source and to the collector electrode of said third transistor whereby said secondary winding provides clock pulses only when said signal voltage exceeds said reference voltage.

3. A comparison circuit of the character described in claim 2 further including impedance matching transformer means having its primary winding connected to said clock pulse source and its secondary winding having one terminal connected to the base electrode and another terminal connected to the emitter electrode of the fifth transistor.

4. A voltage amplitude comparison gating circuit comprising:

(1) two stage differential amplifier means having first, second, third and fourth transistors each having a base, a collector and an emitter electrode, (2) the emitter electrodes of said first and second transistors being connected together and to a common current source, (3) the base electrode of said first transistor being coupled to a source of reference voltage, (4) the base electrode of said second transistor being coupled to a signal voltage to be compared with said reference voltage, (5) the collector electrodes of said first and second transistors being connected to the base electrodes of said third and fourth transistors, respectively, and through a common voltage dividing network to a first common voltage source, (6) the emitter electrodes of said third and fourth transistors being connected together and to a second common voltage source, (7) a fifth transistor having a base, a collector and an emitter electrode and having its emitter electrode connected to the collector electrode of said fourth transistor, (8) the base electrode of said fifth transistor being connected to a source of clock pulses, and (9) transformer means having a primary and a secondary winding,

(10) said primary winding having one terminal connected to the collector electrode of said fifth transistor and another terminal of said primary winding being connected to said first common voltage source and to the collector electrode of said third transistor whereby said secondary winding provides clock pulses only when said signal voltage exceeds said reference voltage.

5. A comparison circuit of the character described in claim 4 further including impedance matching transformer means having its primary winding connected to said clock pulse source and its secondary winding having one terminal connected to the base electrode and another terminal connected to the emitter electrode of the fifth transistor.

No references cited.

ARTHUR GAUSS, *Primary Examiner.*

S. D. MILLER, *Assistant Examiner.*